United States Patent [19]

Ferguson

[11] Patent Number: 5,346,060
[45] Date of Patent: Sep. 13, 1994

[54] LINK ASSEMBLIES WHICH ARE INTERCONNECTED TO PROVIDE A SELF-TENSIONING CONVEYOR BELT

[75] Inventor: Gregory A. Ferguson, New Bedford, Mass.

[73] Assignee: Precision Handling Devices, Inc., Fall River, Mass.

[21] Appl. No.: 114,945

[22] Filed: Aug. 31, 1993

[51] Int. Cl.⁵ .............................................. B65G 17/06
[52] U.S. Cl. ..................................................... 198/853
[58] Field of Search ................................ 198/850–853

[56] References Cited

U.S. PATENT DOCUMENTS

| | | |
|---|---|---|
| 1,098,564 | 6/1914 | Finn ............................ 198/853 X |
| 2,753,983 | 7/1956 | Bloomer . |
| 3,513,965 | 5/1970 | Miller ........................... 198/853 X |
| 3,669,247 | 6/1972 | Pulver .......................... 198/852 X |
| 3,777,877 | 12/1973 | Piper . |
| 3,804,232 | 4/1974 | Freiwald et al. ................... 198/853 |
| 3,807,548 | 4/1974 | Bergeron . |
| 4,195,887 | 4/1980 | Ruddell ......................... 198/853 X |
| 4,586,601 | 5/1986 | Hodlewsky . |
| 4,754,872 | 7/1988 | Damkjaer . |
| 5,027,944 | 7/1991 | Damkjaer . |
| 5,105,938 | 4/1992 | Tan ................................... 198/853 |
| 5,121,831 | 6/1992 | Fesler . |
| 5,174,436 | 12/1992 | Wadell . |
| 5,176,247 | 1/1993 | Counter . |

FOREIGN PATENT DOCUMENTS 370306  4/1932  United Kingdom .

Primary Examiner—D. Glenn Dayoan
Attorney, Agent, or Firm—M. Lukacher

[57] ABSTRACT

A link assembly for an endless conveyor belt includes a pair of side links and a center link interconnected together by way of a spring-biasing mechanism such that the conveyor belt provides its own tension without auxiliary tensioning apparatus.

10 Claims, 9 Drawing Sheets

LINK ASSEMBLIES WHICH ARE INTERCONNECTED TO PROVIDE A SELF-TENSIONING CONVEYOR BELT

BACKGROUND OF THE INVENTION

The present invention is directed toward conveyor belts, and more particularly, to conveyor belts comprised of a series of links which are interconnected together in such a manner to spring-bias each link to adjoining links such that the constructed conveyor belt is self tensioning as the belt system is driven about the conveyor pulley, or sprocket, mechanisms.

A number of conveyor belt systems are known for interconnecting together individual links such that the constructed belt may be driven along a generally circuitous pre-determined path by a pulley, sprocket or similar mechanism. However, such previously known systems generally do not provide a conveyor belt assembly which is self tensioning. Prior known conveyor belt systems coupled individual links together to produce fixed pitch belts wherein tension rollers were provided to adjust, or accommodate, for variations in the length of the belt caused by several factors, including sag and distortion. Further, as the individual pivots of the belt links naturally wear, the pitch of the belt assembly increases. This, in turn, causes a loss of belt tension as the wear is cumulative to the overall belt length. Examples of such belts or belt links are disclosed in U.S. Pat. Nos.: 2,753,983; 3,513,965; 3,777,877; 3,807,548; 4,586,601; 4,754,872; 5,027,944; 5,121,831; 5,174,436 and 5,176,247.

SUMMARY OF THE INVENTION

Therefore, the present invention is directed toward self adjusting link assemblies for conveyor belt systems wherein said links require no external tensioning devices in order to accommodate for variations in belt length caused by natural effects, such as pitch change and wear of the pivot surfaces of the individual belt links. A link assembly in accordance with the present invention includes a series of links which are interconnected together by way of spring-biasing members such that a conveyor belt system constructed from such links is automatically tensioned as the belt assembly is driven along a circuitous path by an appropriate drive pulley or sprocket mechanism.

DESCRIPTION OF THE PREFERRED EMBODIMENT

Figure 1:
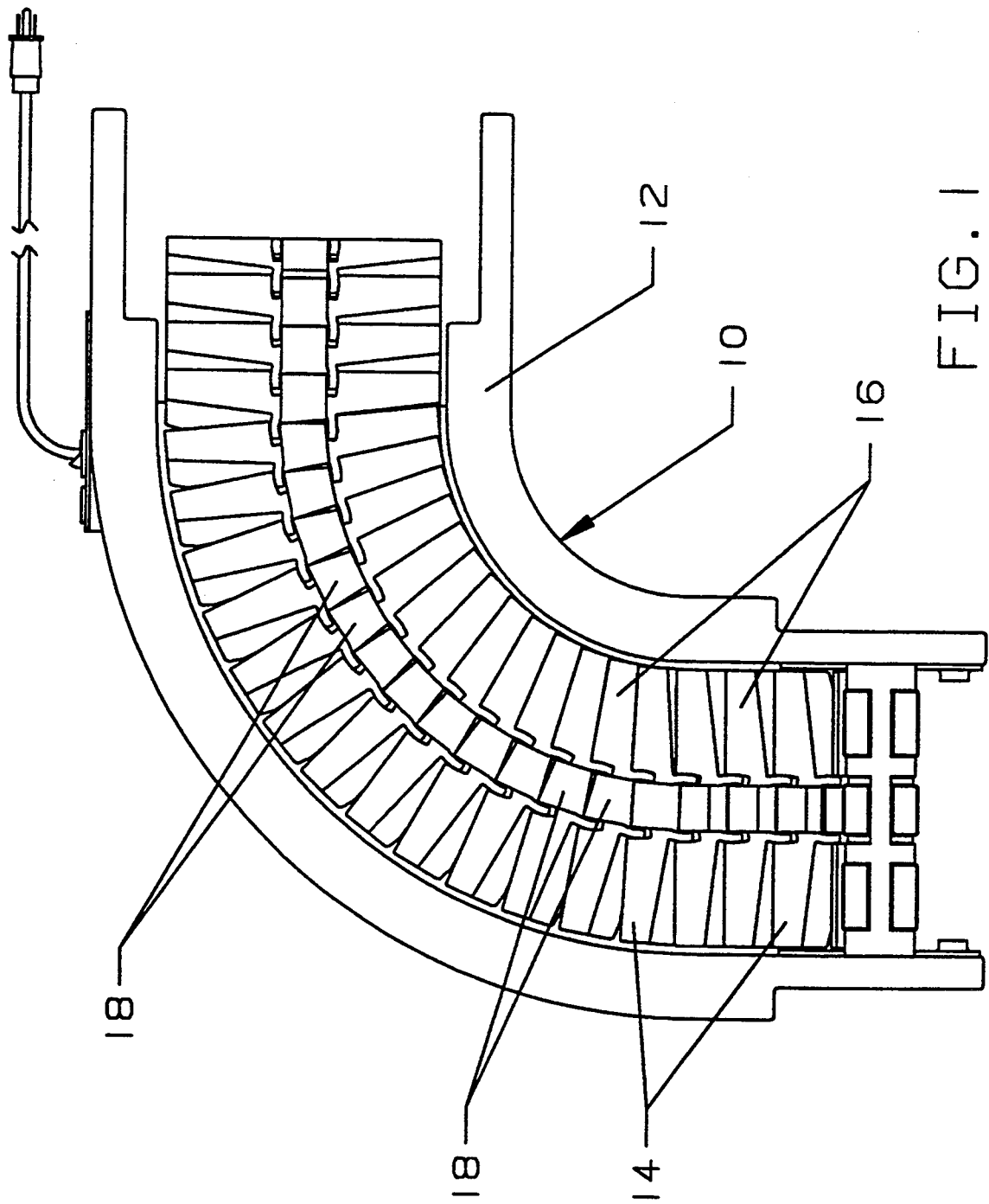
FIG. 1 is a top plan view of a conveyor mechanism utilizing the conveyor belt link assembly of the present invention.

Referring now to FIG. 1 of the drawings, a conveyor belt link assembly 10 according to the present invention is mounted to a generally old and well known conveyor rack 12. Assembly 10 comprises a plurality of sets of mating side links 14 and 16 interconnected to each other by way of mating center links 18 such that each set of side links 14, 16 is movable with respect to every other set of links to which they are interconnected. As the mating side links 14 and 16, essentially, are mirror images of each other, for convenience of understanding the apparatus, by explaining the construction and function of one, the construction and function of the other will be understood. Therefore, by fully describing, for instance, side link 16, side link 14, and its interconnection to mating center link 18, these links as well as the rest of the conveyor belt assembly 10, will be fully understood.

Figure 2:
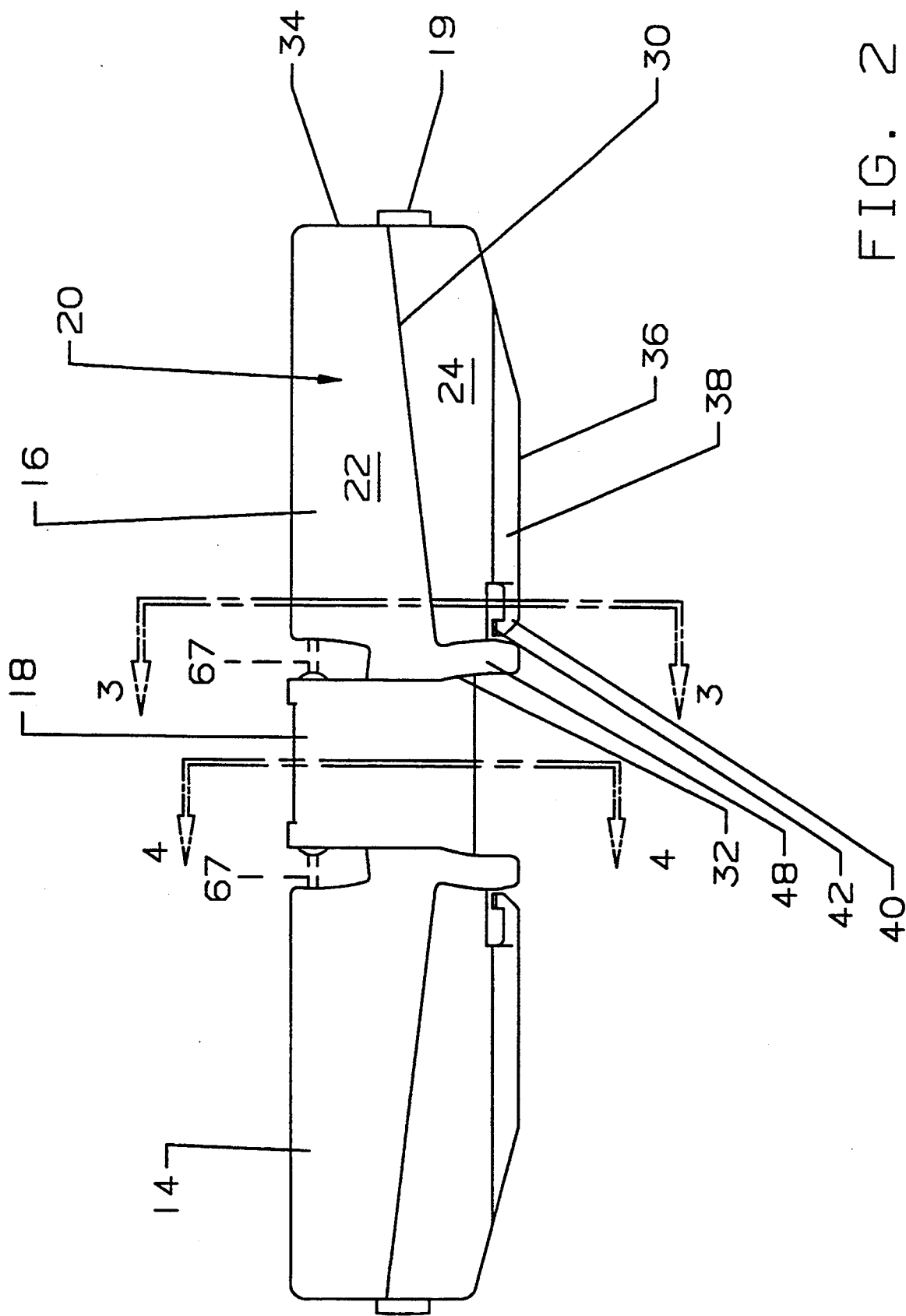
FIG. 2 is an enlarged view of a pair of individual conveyor belt links as shown in FIG. 1.
Figure 3:
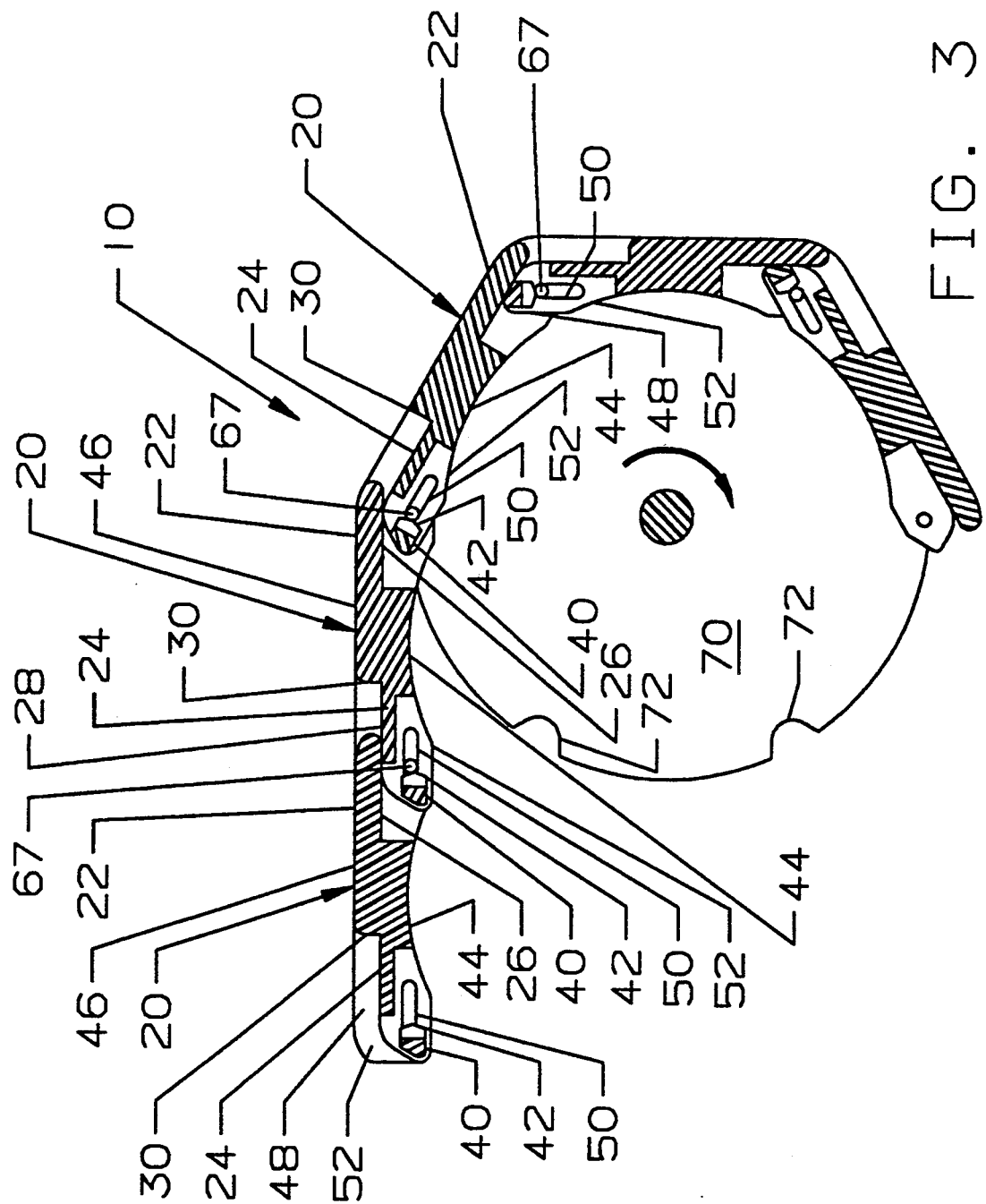
FIG. 3 is a sectional view taken along line 3—3 of FIG. 2.
Figure 4:
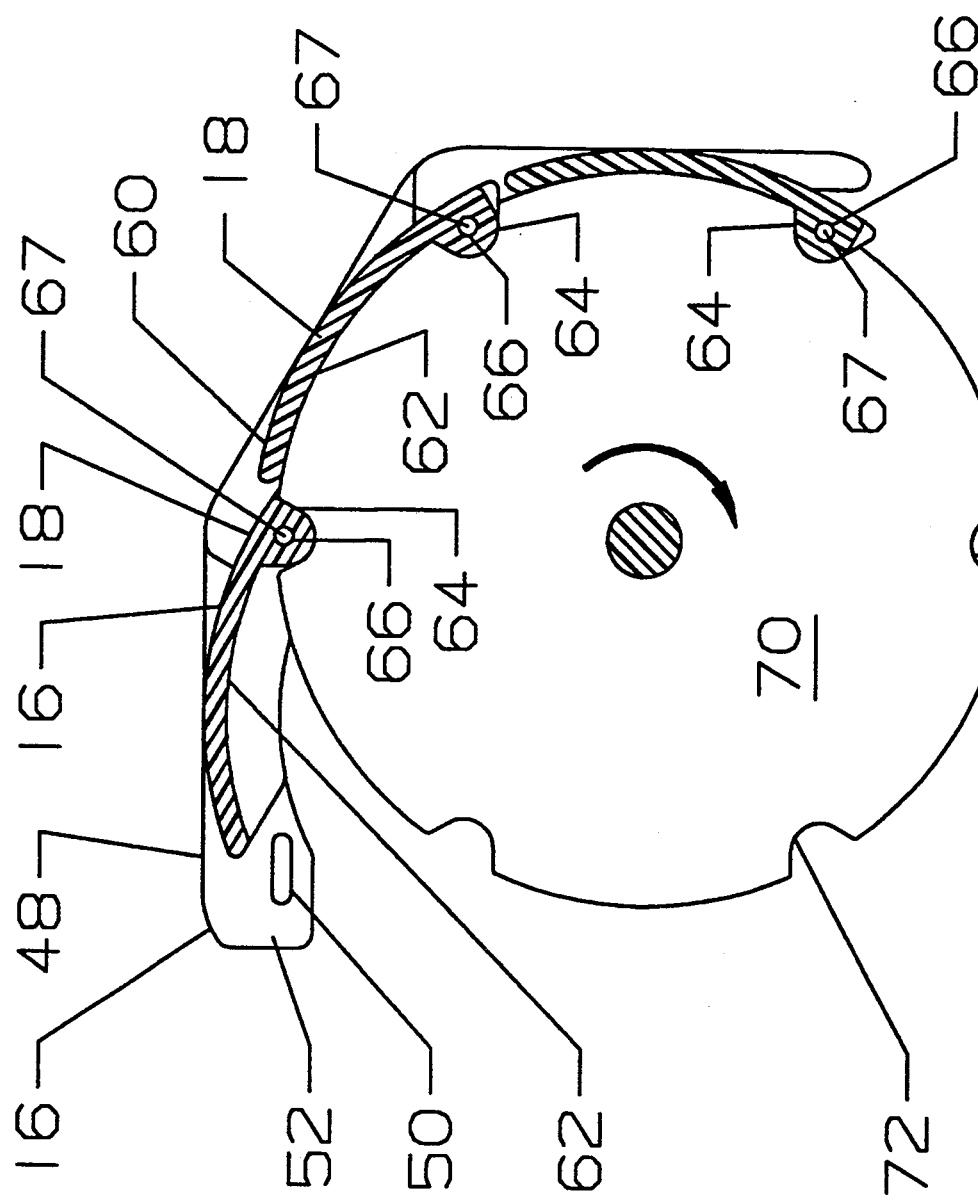
FIG. 4 is a sectional view taken along line 4—4 of FIG. 2.
Figure 5:
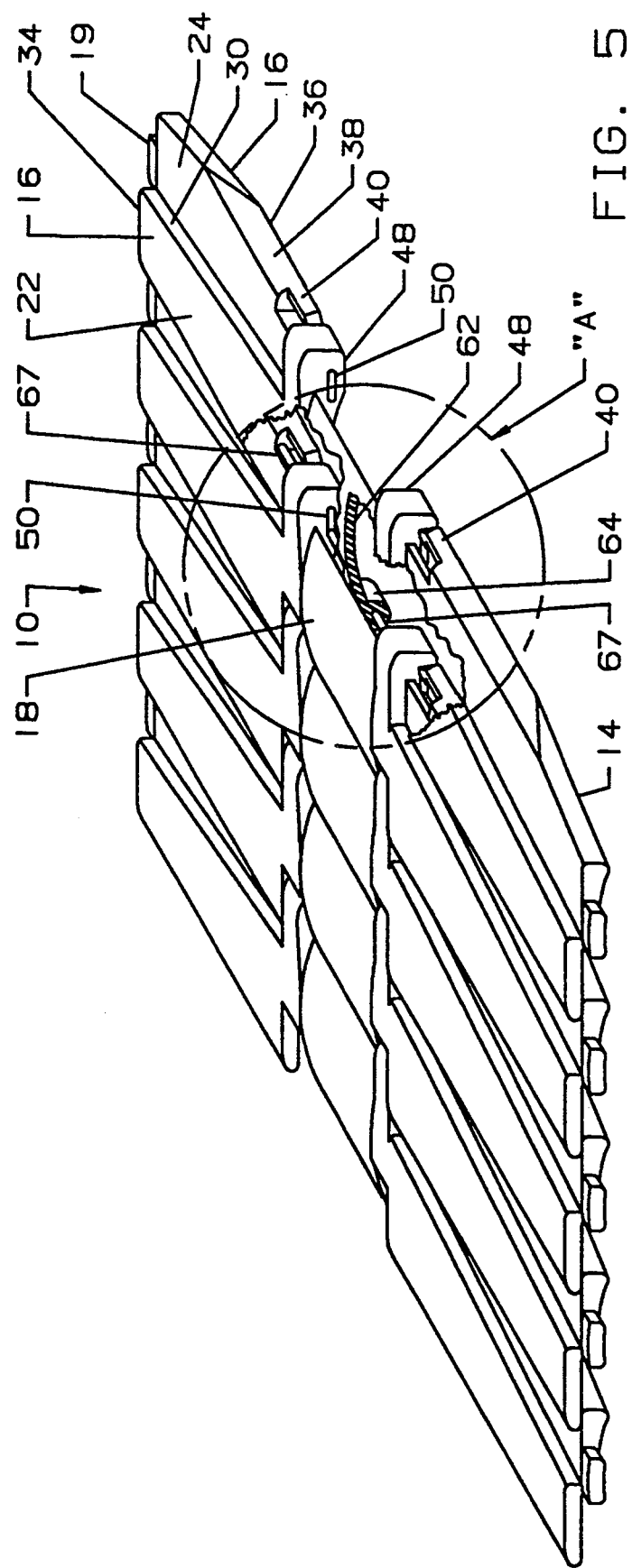
FIG. 5 is a top perspective view of a portion of the assembled conveyor belt link assembly according to the present invention.
Figure 8:
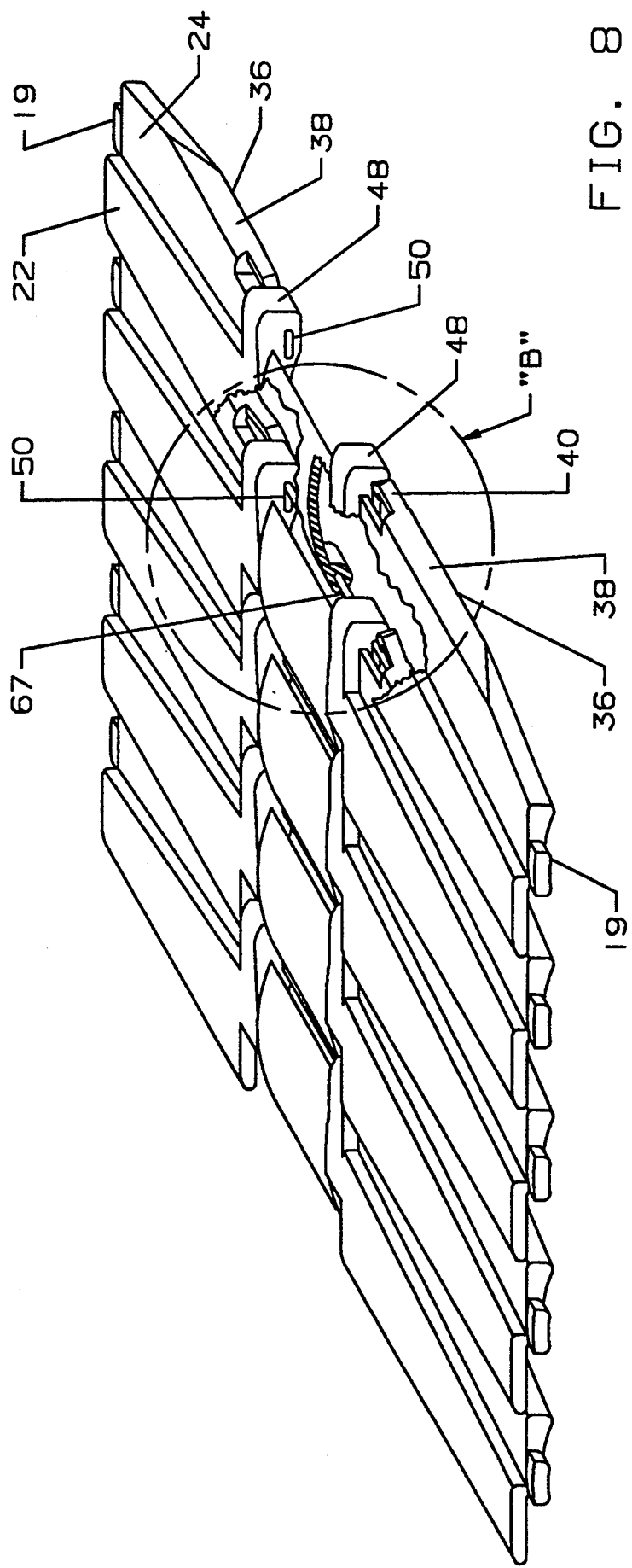
FIG. 8 is a top perspective view of the belt assembly similar to that shown in FIG. 5 wherein the links are slightly separated from each other as happens when the links approach and pass about the drive mechanism.

As is best illustrated in FIGS. 2–4, each link 16 includes a track follower 19, and a stepped surface 20 consisting of a first raised portion 22 and a second lower portion 24. By referring to FIG. 3, it will readily be seen that when the links 14, 16 are interconnected to form a conveyor belt assembly 10, and the belt is generally horizontal as it would be when transporting items, raised portion 22 is configured such that its bottom surface 26 overlaps and rests on the mating top surface 28 of lower portion 24. It will be further seen that the two portions 22, 24 are separated from each other by a generally right angle wall 30 which tapers from approximately the inside edge 32 of each link to the outside edge 34 thereof. The forward edge 36 of lower portion 24, as best seen in FIGS. 5 & 8, is bevelled so as to form a tapered surface 38. A finger-like projection 40 is formed on each link and extends from an area immediately adjacent the tapered surface 38 toward the inner edge 32. Projection 40 includes a bevelled edge 42 and is essentially parallel to bottom and top surfaces 26, 28 respectively. It will be seen that the bottom surface 44 of each link 16 is generally rounded, while the top surface 46 (which includes the tops of portions 22, 24 respectively) is generally flat.

Figure 7:
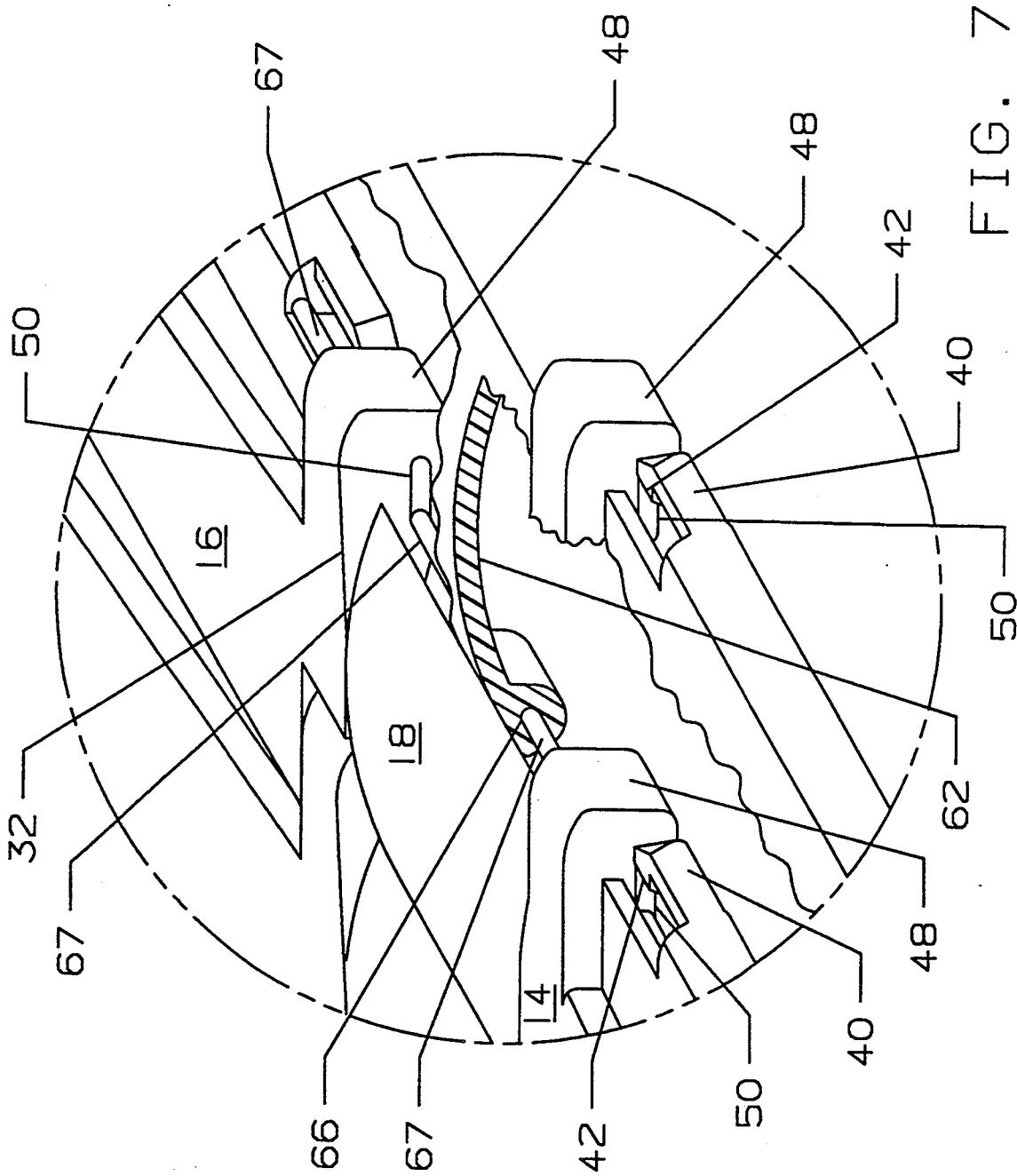
FIG. 7 is an enlarged view of a portion of the conveyor belt link assembly as indicated by highlighted area "A" of FIG. 5.

A flange abutment 48 is juxtaposed to finger-like projection 40 and extends from link 16 generally perpendicular thereto, as is best illustrated in FIGS. 2, 5 & 7. Abutment 48 includes an elongated aperture 50 formed in sidewall 52, as best seen in FIGS. 2 and 3.

Figure 9:
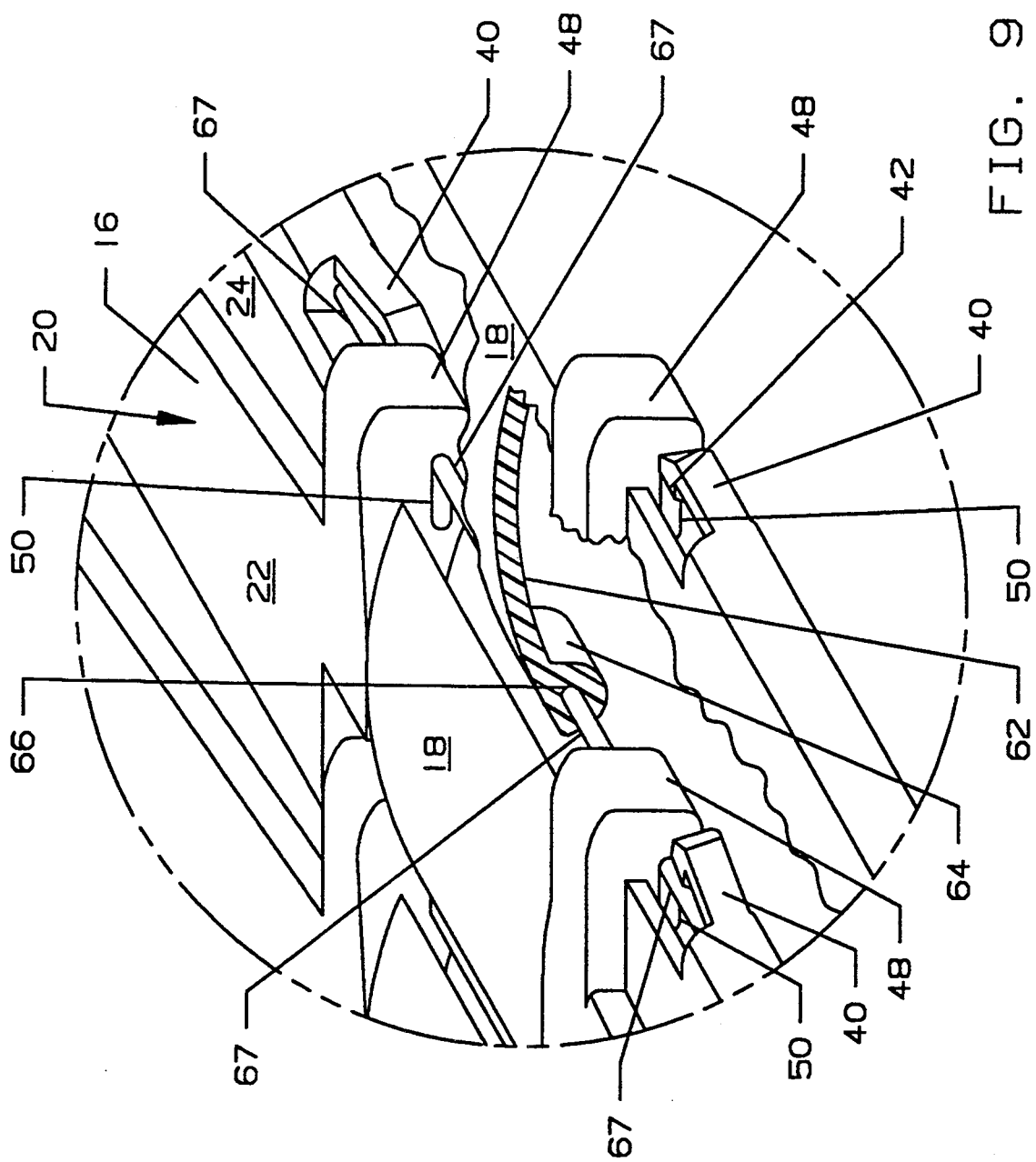
FIG. 9 is an enlarged view of a portion of the conveyor belt link assembly as indicated by highlighted area "B" of FIG. 8.

Center mating link 18, as best illustrated in FIGS. 4, 7 & 9, has generally arcuately-shaped upper and lower surfaces, 60 and 62, respectively. A flange section 64 having a through-bore 66 extends downwardly from surface 62.

As shown in FIG. 1, each of the individual links 16 is assembled together with as many other links as required in order to form a continuous conveyor belt 10 of predetermined dimensions. Accordingly, a connecting pin 67 is journalled to through-bore 66 of center mating link 18 and into elongated aperture 50 of flange abutment 48 of links 14 and 16, thereby joining the links together. It will be appreciated by reviewing the drawings, especially FIG. 3, that bevelled edge 42 of finger-like projection 40 is situated so as to bear against the connecting pin 67. In this manner, a continuous link conveyor belt assembly is formed.

Figure 6:
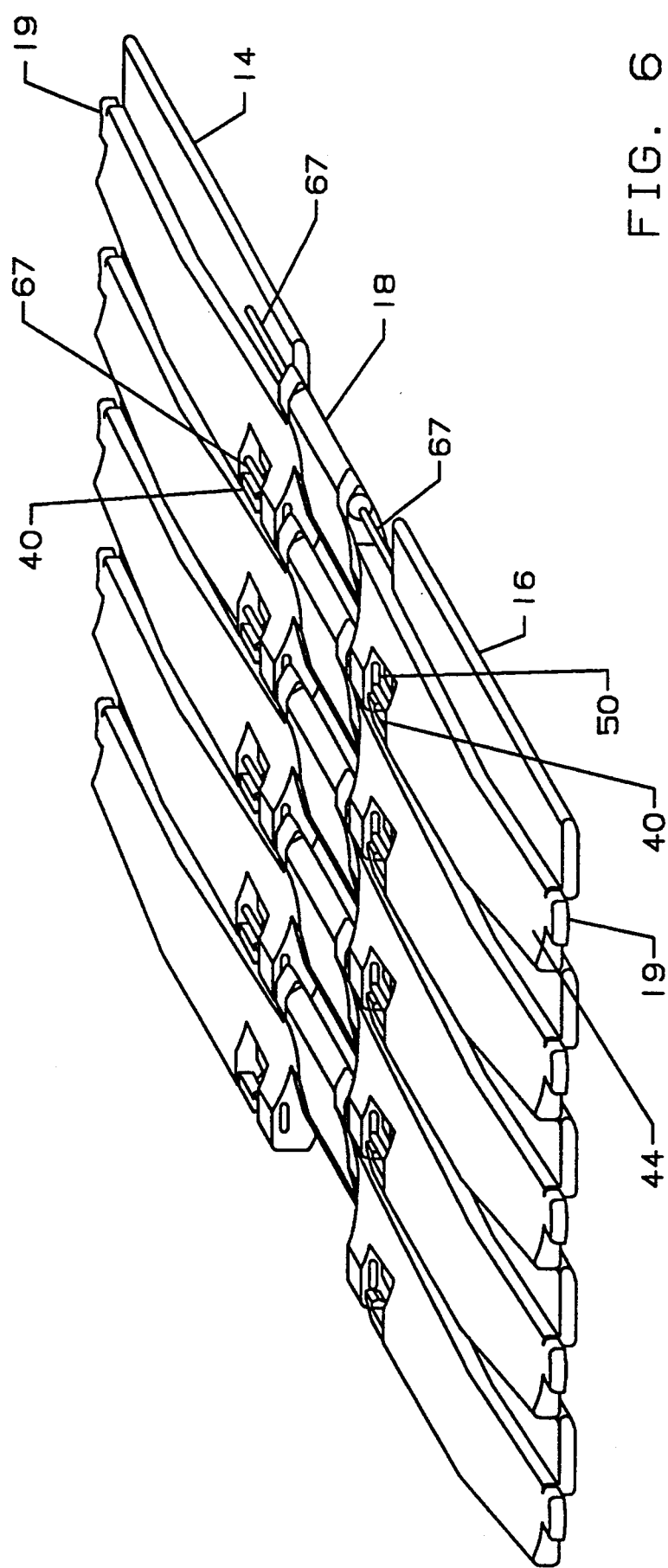
FIG. 6 is a bottom perspective view of the conveyor belt link assembly shown in FIG. 5.

It will be seen from the drawings, and particularly FIGS. 3, 5 and 6, that upon assembly of the links of the conveyor belt, each individual link overlaps the adjacent link to which it is mated. That is, as previously described, the bottom surface 26 of raised portion 22 is configured so as to engage and rest on top surface 28 of lower portion 24. Connector pin 67 is positioned in such a manner that it is engaged by and bears against the bevelled surface 42 of finger-like projection 40. It is important to understand that the construction of the finger-like projection, as well as the selected material of construction, play an essential part in the success of this invention. It has been found that certain plastics, such as, for example, polypropylene, acetal and nylon among others, perform extremely well, are quite strong and durable and are of modest cost which enables production cost and, therefore, final costs to be kept to a minimum. It is evident from examination of the drawings that the finger-like projection 40 is configured so as to pivot, or bend, about an axis, and thereby effectively act as a spring member when engaged by connecting pin 67. That is, as the conveyor belt is moving horizontally along the conveyor rack 12, finger-like projection 40 is deflected against connector pin 67 by the initial pretension determined by the fixed center distances of the end pulleys (around which the belt travels) being of a length greater than the length of the "relaxed" belt. However, when the assembled belt is being wrapped around a drive mechanism, such as is illustrated in FIGS. 3 & 4 as drive sprocket 70, toothed areas 72 formed on sprocket 70 engage flange portions 64 on link 18 and boss 26 on links 14, 16 and the belt assembly is forced to assume the correct design pitch.

That is, when the individual links 14, 16 are flat and parallel with respect to each other, as is shown in FIGS. 5 & 6, connecting pin 67 is merely engaged by the bevelled edge surface 42 of projection 40. The belt assembly is "relaxed" in this position with no distorting forces being applied to the finger-like projections 40. As previously described, by way of the construction and material selection of the links 14, 16 and resulting projections 40, a predetermined and fixed amount of tension is applied by the projections against each connecting pin 67 such that the conveyor belt assembly has sufficient tension to remain taut.

In standard (prior art) belt assemblies, the length of the belt effectively changes to accommodate for the change in pitch induced by the radial movement of the links as the belt travels around its drive pulley. Therefore, sagging of the belt assembly occurs. Normally, this change in belt length dictates that external belt tensioners be utilized to accommodate for the resultant slack in the system.

In accordance with the invention, the belt is "short pitched" in its straight section. That is, the belt corrects pitch automatically as it rotates into the sprocket, or pulley 70. Correct belt tension results as the center to center of the belt path between the sprocket or pulley around which the belt travels, is greater than that of the belt in its relaxed state. The tension results from the cummulative effect of deflecting projections 40 on each link 14, 16.

But, it will be seen from reviewing FIGS. 8 and 9 that as the belt assembly utilizing the links of the present invention is engaged by and passes around the drive pulley, or sprocket 70, the design of the finger-like projection 40 produces a device which functions as a cantilevered spring beam that forces the connecting pin 67 of one link 14, 16 against the adjoining next link. The true pitch (the distance between one connecting pin and the next connecting pin in the belt assembly) is thereby altered (short pitched) by forcing the two pins closer together. The elongated aperture 50 through which pin 67 is fitted permits for such back and forth sliding movement. Accordingly, as the belt assembly is driven by the drive pulley, or sprocket 70, the distance between the links is constantly being altered. The bevelled front surface 38 constructed at the front edge 36 of each link 14, 16 ensures that each link remains below the trailing, or rearward most, edge of the link to which it is connected by way of connecting pin 67.

Further, as shown in FIG. 1 the belt assembly constructed utilizing individual links according to the present invention is designed to not only wrap around a drive mechanism, such as drive pulley or sprocket 70 but, also to change directions as the links migrate along the selected travel path. It will be seen that the construction of the links 14, 16 permit such direction changes to occur by allowing the links to overlap themselves when joined together. For example, by referring to FIG. 1 it will be understood that as the conveyor belt assembly changes directions, that the outside of the assembled links travels through a greater radius than does the inside of the links. Thus, it is imperative that the links be able to automatically adjust for this difference.

Referring to FIG. 3, it will be evident that as one link rests upon another by way of the overlapping surfaces 22, 24 that the angle, or direction, of the belt assembly may be changed without belt separation. The individual links of the assembly merely slide back and forth with respect to one another whether going around the drive mechanism or assuming a change in direction. Again, as previously described, the bevelled surfaces 38 constructed on the front edge 36 of each of the links 14, 16 ensures that the each link remains properly oriented with respect to the links to which it is connected. Additionally, vertical wall 30 acts as a stop to ensure that the links maintain their positional relationship with respect to each other.

Variations and modifications in the herein described link assembly within the scope of the invention will undoubtably suggest themselves to those skilled in the art. Accordingly, the foregoing description should be taken as illustrative and not in a limiting sense.

What is claimed is:

1. A link assembly for use in an endless conveyor belt movable along a conveyor rack when driven by a drive mechanism, said assembly comprising a plurality of links interconnected adjacent to each other to form the belt, said links comprising a pair of side links being engageable with said rack, each of said links also having an upper bearing surface and a lower bearings surface, said upper bearing surface and said lower bearings surface of adjacent ones of said interconnected links being arranged in overlapping relationship to form said endless conveyor belt, a center link disposed between and connected to said side links of each of said links, means on said center links for engagement with said drive mechanism for providing motion to said endless conveyor belt, means connected between said side links and the center links of adjacent ones of said interconnected links for coupling said links in overlapping relationship to form said belt, and said coupling means including means formed on said side links and disposed in engagement with said center links for mating in spring-loaded relationship said adjacent links to provide tension in said endless conveyor belt.

2. The link assembly as set forth in claim 1, wherein said spring-loaded relationship is provided by cantilever spring beams disposed on said side links.

3. The link assembly as set forth in claim 2, wherein said cantilever spring beam is formed on said side links adjacent said center link.

4. The link assembly as set forth in claim 3, wherein said cantilever spring beam includes means thereon engaged with said means for coupling together said side links and said center links.

5. The link assembly as set forth in claim 4, wherein said means engaged with said means for coupling together said side links and said center links comprises a bevelled surface formed on said cantilever spring beam so as to contact said coupling means.

6. The link assembly as set forth in claim 1, wherein said means coupling together said side links and said center links comprises elongate connector pins extending between said center links and said side links.

7. The link assembly as set forth in claim 6 wherein said elongate connector pins are fitted through apertures in said center links, cantilever spring beams extending from said side links and engageable with said connector pins, said apertures having substantially the same diameter as said connector pins and journalled through elongated apertures in said side links such that said connector pins are moveable in said elongated apertures and said spring beams engage and exert spring forces against said connector pins to provide said spring-loaded relationship thereby ensuring that proper tension is constantly applied to said link assembly.

8. A link assembly as set forth in claim 1, wherein said link assembly is formed from plastic material selected from the group consisting of polypropylene, acetal and nylon.

9. A link assembly as set forth in claim 6 wherein said coupling means providing said spring-loaded relationship is the exclusive means for providing constant tension in said belt formed from said links when in said assembly.

10. The link assembly as set forth in claim 1, further comprising an endless track follower on each of said side links engageable with said rack.

* * * * *